Sept. 29, 1942.   C. HARDY ET AL   2,297,554

WELDING

Filed Feb. 29, 1940

INVENTORS
Charles Hardy
Raymond L. Patterson
BY
ATTORNEYS

Patented Sept. 29, 1942

2,297,554

UNITED STATES PATENT OFFICE 2,297,554

WELDING

Charles Hardy, Pelham Manor, and Raymond L. Patterson, New York, N. Y., assignors to Hardy Metallurgical Company, New York, N. Y., a corporation of Delaware Application February 29, 1940, Serial No. 321,368

3 Claims. (Cl. 113—110)

This invention relates to welding and is concerned particularly with the welding of confined or relatively inaccessible joints of intricate shape employing welding compositions that are brittle or otherwise relatively unworkable in conventional massive form. The invention affords particular advantages in the end to end welding of tube, especially tubes of copper, brass and the like, with welding compositions containing copper and phosphorus, but may be employed to advantage in welding a variety of metals and in numerous forms of joints.

Hereinafter, we employ the term "copper" to describe tubes and other members to be welded together which are made of copper and alloys thereof in which copper is a major constituent.

Modern welding technique affords a great variety of welding compositions, but the use of many of these compositions in certain kinds of welding is hampered because the compositions are brittle or otherwise unworkable so that their manufacture in special shapes desired for these kinds of welding is not economically feasible. We have discovered that it is advantageous to weld copper tubing and the like end to end by telescoping a first tube end snugly into a second tube end having an inner cross section corresponding approximately to the outer cross section of the first tube end and welding the two together by means of a continuous but porous ring of phosphor-copper or other mixture or alloy containing relatively high proportions of phosphorus and copper. The ring is disposed adjacent the first (or inside) tube end within the second tube and substantially coaxial with the tubes and has substantially the same cross section as the first tube. In this position the ring is heated to the fusing point, advantageously by conduction from the outside of the telescoped tubes, and in such a way that the temperature of substantially all portions of the ring is raised at substantially the same rate, i. e., in such manner that no thermal gradient exists between different portions of the rings. As its temperature is raised the ring becomes plastic but, due probably to its continuous character, retains its annular form until it suddenly fuses and, probably due to capillary forces, flows into the joint formed by the telescoped tubes and welds them together firmly, cleanly and almost instantaneously with a minimum consumption of welding composition. This operation may be facilitated if the outer of the two tube ends is an expanded section into which the ring and the inner of the two tube ends are fitted, with the ring substantially abutting the unexpanded portion of the first tube and with the inner tube end abutting the ring. This structure is easily assembled and assures that the ring will be held in the correct position. Moreover, this structure appears to permit the formation of a better joint by furthering the flow of fluid copper-phosphorus composition into the joint between the tube walls, especially when the ring is pressed firmly between the tubes.

To summarize, our invention contemplates a bonding element for bonding together two interfitting metallic members, said element being shaped to fit adjacent the space between the interfitting members in which the bond is to be formed and comprising a substantially porous but coherent mass of copper powder containing phosphorus in proportions ranging from 5 to 10% by weight, the porosity being from 5 to 40% of the volume of the element.

Flow of the composition may also be furthered by the method of heating. Advantageously, a torch or other source of heat is first applied to the end of the outer tube and moved gradually along this tube toward the ring, the rate of movement being adjusted so that a zone of red heat develops where the torch is first applied and then moves gradually toward the ring. When the portion of the tube overlying the ring becomes red, the torch is then moved gradually back toward the end of the outer tube. This movement of the torch, or rather, the changing temperature gradients which the movement sets up, appears to increase the force of capillarity in the joint formed by the telescoped tubes. At all events, the movement results in heating the joint to be welded to the appropriate temperature and in a sudden flow of the fluid welding composition into the preheated joint, so that, if the joint and the ring are properly proportioned substantially all of the metal of the ring will be drawn into the joint and the latter will be securely welded from end-to-end.

The above-described method, although technically excellent, depends for widespread application upon cheap production of the welding rings employed. As indicated, hereinbefore, the rings must be continuous but porous. Discontinuous rings (made, for example, by the expensive procedure of annealing relatively brittle wire and bending the annealed wire around a mandrel) are not altogether satisfactory, for flow of metal begins at the gap in the ring before the rest of the ring is fluid. So, unless the joint is so disposed that gravity directs the flow of molten metal thereinto, a satisfactory weld is not formed. And, in many instances, even with the joint held vertically with the end of the inner tube downward, the ring upon melting does not flow into the joint. On the other hand, when the ring is continuous (i. e., integrally formed) the joint may be disposed at almost any angle without interfering with good welding. This is of great practical importance, for in house plumbing and in most other industrial fields, joints must be welded in many positions.

As indicated hereinbefore, massive phosphor-copper containing desirable proportions of phosphorus for welding purposes, say, 5–10%, is difficult and expensive to work. Manufacture of continuous phosphor-copper rings by casting, forging, etc. does not appear to be commercially feasible, at least at present. And cutting the rings from a tube of phosphor-copper of high phosphorus content is not satisfactory because of the toughness of the metal and the large proportion of waste in the form of cuttings.

We have found, however, that continuous rings and other special welding shapes of metals which, by reason of brittleness or other properties, may not be formed economically from massive metal, may be made cheaply by powder metallurgical methods as described hereinafter. Moreover, rings and other relatively detailed shapes made in accordance with our invention may be superior in several respects as compared with similar shapes made from massive metal. Thus, we have discovered that the metallurgical addition agents described and claimed in the copending application, Serial No. 241,609, filed November 21, 1938, by Charles Hardy, which has resulted in Patent No. 2,200,742, Nov. 14, 1940, and comprising the powder of a metal with which phosphorus tends to combine exothermically, the particles of the powder containing diffused free phosphorus, may be compacted in the cold state under pressure to form continuous porous rings and similar coherent shapes (and even subjected to a mild, but usually sufficient, heat treatment) without bringing about the release of all the exothermic heat stored in the powder. The potential heat thus retained in the ring or other shape is thus rendered available in the subsequent welding step.

Thus, uncompacted copper powder which has been heated in the presence of phosphorus at a temperature above the melting point of phosphorus but below 370° C. and preferably below about 135° C. until the phosphorus becomes diffused into the particles with at least a portion of the phosphorus remaining in the free state may be compressed into the form of a continuous ring under a pressure of say 25 to 60 tons per square inch. The resulting ring, without further treatment, may be employed successfully in welding in the manner described hereinbefore, and, from the standpoint of thermal efficiency, is the preferred form to employ. Such a ring is of accurate configuration and strong enough to stand normal handling.

If desired, such a ring may be subjected to a mild heat treatment to bring about some bonding between the powder particles, but this heat treatment may involve the sacrifice of some or even all of the potential exothermic heat and should only be resorted to when the ring is to be subjected to unusual mechanical strain in the welding operation. The heat treatment, moreover, should be carefully conducted; otherwise the ring tends to become distorted and so inaccurate in its configuration that it will not fit into the tubes for which it is intended. We have found that in heat-treating compressed rings made from phosphor-copper powder, (5–10% phosphorus content) or from copper powder containing diffused free phosphorus and having a total phosphorus content of 5–10%, heat treatment in a non-oxidizing atmosphere at a temperature ranging from 260° C. to about 540° C. for a period of about 5 minutes imparts additional mechanical strength to the rings, but does not bring about intolerable distortion. Such heat treatment, however, does bring about generation and dissipation of some of the exothermic heat if free phosphorus is present, and hence should be avoided, if possible.

Ordinarily, it will be possible to produce a ring or other shape having sufficient mechanical strength by means of pressure alone while maintaining the powders in a relatively cold state, and as between employing higher pressures and resorting to heat treatment, the former is preferable.

As indicated hereinbefore, the application of our invention is not limited to the welding of tubes (although this appears presently to be the field in which it affords its greatest advantages, especially in the end to end welding of refrigerator tubing, copper and brass tubes for plumbing and the like), nor to the use of welding members in ring form (although the continuous ring form affords peculiar advantages in tube welding), nor to the use of welding agents in which free phosphorus is available for exothermic combination with the metallic component of the member (although here again substantial advantages may be reaped). On the contrary, our invention contemplates the welding of a variety of types of joints, especially those that are of intricate shape and are confined or relatively inaccessible, employing as a welding agent a welding composition in the form of a compressed and coherent mass of powders. In this manner, a welding composition (that because of brittleness, toughness, thermal instability, or other unfavorable physical characteristic otherwise cannot be preformed economically into a particular shape) may be made available in a form to facilitate rapid and efficient welding. By way of example, such a welding composition (for example, brass containing 50% Cu and 50% Zn) may be made in the shape of thin sheets for interposition between overlapping plates to be welded together by heating the plates from the outside, or in the shape of thin angle plates for welding angular joints in like manner, or in a variety of other forms to conform to the particular shape of the joint to be welded. Sheets, angle plates, rings and other shapes may be made by compressing powders of phosphor-copper, brittle brass (say, brass made up of about equal parts of copper and zinc), or the powdered metallurgical addition agents described and claimed in the aforementioned copending application. Such metallurgical addition agents include the powders of platinum, zinc, nickel, cobalt, silver, gold, copper, lead, cadmium and tungsten, the particles of said powders containing free phosphorus that is available for exothermic combination with the metal with which it is associated. In addition to metallic welding compositions, the compressed compact of desired shape may include powdered fluxes, such as borax. In short, our invention contemplates the improvement in welding which comprises forming a powdered metallic welding agent into a coherent porous member corresponding in shape substantially to that of the joint to be welded by compressing the powdered agent in a mold, disposing said member adjacent the joint to be welded, heating the joint to welding temperature and subsequently heating the member, while the joint is maintained at welding temperature, to cause the member to fuse and flow in the joint.

These and other features of our invention will be more thoroughly understood in the light of the following detailed description of presently preferred practices of the invention, taken in conjunction with the accompanying drawing, in which.

Figure 1:
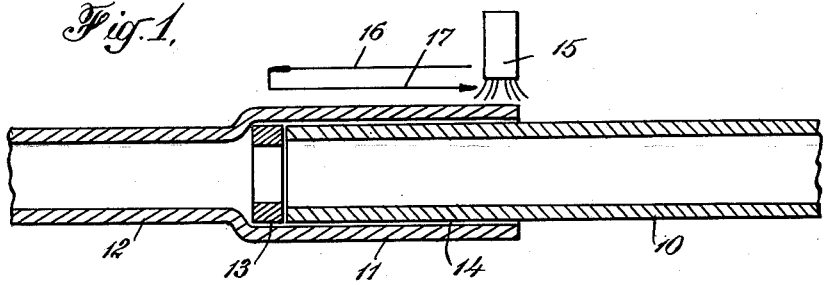
Fig. 1 is a section through a tube joint to be welded employing the ring and the method of our invention.

The manufacture of the welding members of our invention will be illustrated by a description of the making of rings for end-to-end welding of copper tubing or the like, these rings being made from powders of phosphor-copper or from copper powders the particles of which contain diffused free phosphorus. The phosphorus content of the powders in either case should be such as to impart a desirable fluidity to the material, say 5 per cent to 10 per cent, and preferably 7.3 per cent (the eutectic proportion).

In accordance with our invention, phosphor-copper powders, or, preferably, copper powders containing diffused free phosphorus made as described hereinbefore, having a size ranging up to 40 mesh, are compressed at atmospheric temperatures under a force of about 30 to 60 tons per square inch in a mold to form a coherent continuous ring. The compressive force employed should be such as to impart sufficient mechanical strength to the ring without rendering it non-porous for we have found that a porous member is a better welding agent. Thus, the ring should have a porosity ranging from about 5% to about 40% of the volume of the ring.

The outer diameter of the ring should be slightly less than the inner diameter of the outermost of the two tubes and should fit loosely into said outermost tube. The inner diameter of the ring preferably is slightly less than the inner diameter of the inner tube so that the ring has a wall thickness slightly greater than the wall thickness of the inner tube.

The depth of the ring along its axis will vary depending upon the amount of space in the joint to be welded. Generally speaking, most joints are welded effectively by a ring which has a depth corresponding approximately to its wall thickness, but for longer joints a ring of greater depth may be required.

When free phosphorus is present in the powder which is compacted into the ring the pressure employed should not exceed about 75 tons per square inch, if it is desired that the free phosphorus present shall remain in this state. Such pressure limit, however, does permit the formation of an adequately coherent ring. And higher pressures may be employed if steps are taken to remove from the ring during compression the heat generated thereby, so as to prevent the ring from attaining a temperature at which the metal and the phosphorus contained in the powder react exothermically.

The compressed porous ring formed as described above is suitable for use in most industrial applications, and in most instances it will be desirable to employ the compressed ring as a welding member without further heat treatment. Heat treatment, however, may be desirable when the ring in the welding may be subjected to excessively heavy strains. The heat treatment must be conducted so as to avoid distortion, and preferably is so conducted that at least a part of any exothermic heat of reaction between phosphorus and metal that is potentially available in the ring is preserved for use in the welding. To avoid distortion of phosphor-copper rings and the like containing from about 5 per cent to 10 per cent phosphorus, heat treatment should be conducted in a non-oxidizing atmosphere at a temperature ranging from 260° C. to 540° C. for a relatively short time, say, 5 minutes. At the upper limit of this temperature range substantially all of the exothermic heat is released. However, in the neighborhood of the lower limit of the temperature range, some exothermic heat of reaction is conserved.

A variety of non-oxidizing atmospheres may be employed. Thus, the rings may be heat-treated in an electric furnace or the like in a non-oxidizing atmosphere of hydrocarbon gases, carbon monoxide, carbon dioxide, hydrogen, or nitrogen.

Figure 2:
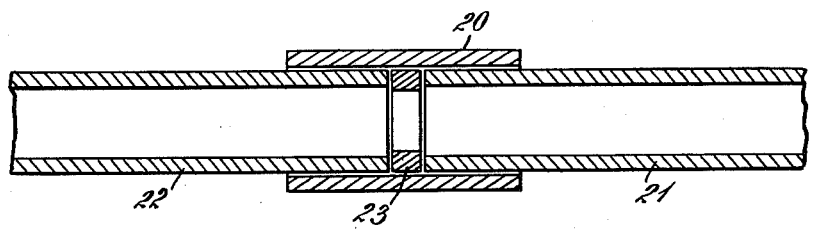
Fig. 2 is a section through another form of tube joint to be welded in accordance with our invention.

The ring, whether in its original compressed state or after heat treatment, may be employed in welding in various ways but preferably is employed in welding tubes end-to-end as described hereinbefore and as illustrated in Figs. 1 and 2.

Fig. 1 illustrates the arrangement of the porous ring and tube ends in a preferred practice of the invention. Thus, female tube 10 is inserted into the expanded portion 11 of male tube 12 following the insertion of the ring 13. The tubes and the ring are thus disposed coaxially with the ring abutting the unexpanded portion of the outer tube with the inner tube substantially in contact with the ring. The inner tube may be pressed slightly inwardly to hold the ring in place and to assure adequate contact between the ring and the members to be welded together. During subsequent welding a space 14 between the walls of the inner and outer tubes is filled with molten welding agent from the ring and an autogenous bond is formed between the two tube ends in this manner.

To assure adequate welding, it is not essential that the heat treatment be conducted in any particular manner, provided that the two walls to be welded together are heated to an adequate temperature prior to the time that the ring suddenly fuses. However, we have found that stronger welds and a greater frequency of strong joints results when the heating is conducted as described hereinafter.

Thus, our preferred method of heating in forming a joint between the tubes illustrated in Fig. 1 is to apply a torch or other source of heat 15 (illustrated diagrammatically on Fig. 1) to the end of the outer tube remote from the ring. The heat source is maintained at that point until the copper tubing glows a dull red and then is moved gradually along the outer tube in the direction of the ring, the speed of movement being so governed that the red zone progressively advances toward the ring. In this manner, the heating source eventually arrives in the region of the ring and is held at this point until the outer tube glows red. The movement of the heating source is then reversed, and it is moved gradually back to the point at which it was first applied, the speed of movement being such that the tube again glows red under the torch as the latter advances. The movement of the heating source is illustrated on Fig. 1 by the arrows 16—17. Sometime during the heating step as so conducted and usually during the backward movement of the heating source toward the outer end of the outside tube, the porous ring (which has been rendered pasty by the heating) acquires sufficient heat to render all parts of it fluid simultaneously. The ring thus suddenly disintegrates in toto with the result that a film of molten welding agent flows simultaneously to all parts of the joint. If the operation is properly conducted the flow of fluid into the joint will be relatively energetic, so energetic, in fact, that a portion of the fluid will actually be projected beyond the outside end of the outer tube, provided, of course, that there is sufficient excess to permit such overflow. Substantially none of the metal ring will remain in its original position and substantially none of it will be wasted, since there is almost complete passage of the material of the ring into the joint. As compared with other methods of welding copper tubing and the like end-to-end the use of the rings of our invention is particularly economical, for in this way about 450 welds can be made with the same amount of welding agent heretofore employed to produce 150–175 welds by the best prior procedure known to us.

It is desirable (although not necessary in most work) to protect the ring from oxidation during the welding step. The ring may be protected from oxidation by maintaining an atmosphere of reducing or non-oxidizing gas in the tubes. This may be done conveniently by passing a current of $CO_2$ or other non-oxidizing gas through the tubes during the welding operation. This procedure may be desirable when absolute assurance of a sound weld is required as, for example, when welding together lengths of refrigerator tubing.

Fig. 2 illustrates a modification of the practice described with reference to Fig. 1, in which a sleeve 20 takes the place of the extended portion 11 of the outer tube in Fig. 1. Thus, in forming a weld, as illustrated in Fig. 2, a tube 21 is inserted into one end of the sleeve 20 and a tube 22 is inserted into the other end with the ring 23 disposed between them within the sleeve. In forming a weld of the members illustrated in Fig. 2, it is desirable to first heat the portions of the sleeve remote from the ring to the point at which they became red and then to heat the central portion until it too becomes red and attains a temperature at which the ring liquefies. In this manner, the joint to be welded is assuredly maintained at a proper temperature when the welding composition becomes fluid.

The rings of our invention offer their greatest advantages in an operation wherein the ring is confined within a tube. However, the rings may be employed to butt weld two tubes together without employing a surrounding sleeve, the ring being interposed between the butts and held in this position while the heat is applied directly to it.

As indicated hereinbefore, our invention is applicable to welding operations conducted with welding members in other than ring form and affords particular advantages in the welding of various intricate joints. For example, a joint between overlapping pieces of copper or brass may be welded by disposing in the joint between the two sheets a coherent compressed mass of powders in the form of a thin porous plate having a contour corresponding to the shape of the joint. Thus the powdered metallurgical addition agents described and claimed in the copending application Serial No. 241,609, filed November 21, 1938, by Charles Hardy, may be compressed in the cold into an appropriate shape, which should conform roughly to the shape of the joint to be formed.

Figure 3:
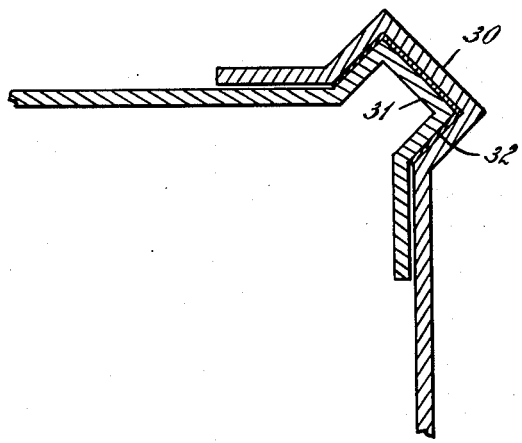
Fig. 3 is a section through an angle joint showing the application of an angular welding member to said joint.

The application of our invention to joints other than those formed between tubes is illustrated in Fig. 3 wherein a pair of interlocking plate members 30, 31 are shown in section, the two plates being fastened together to form a corner. In accordance with our invention, a thin porous channel-shaped welding member 33 is formed as described hereinbefore and interposed in the joint to be welded. The joint is then heated by conduction through the plates, care being taken to see that all portions of the joint are raised to welding temperature before the welding agent is fused. The operation may be facilitated by clamping the plates together with the welding agent in between. When the joint has been brought up to welding temperature, the heat source is concentrated adjacent the welding member. The temperature of the latter then rises to the point at which it becomes fluid, whereupon welding occurs. The channel is somewhat smaller than the joint which it forms, since the welding agent when fluid tends to flow into all portions of the space between the overlapping plates.

We claim:

1. A bonding element for bonding together two interfitting metallic members, said element being shaped to fit adjacent the space between the interfitting members in which the bond is to be formed and comprising a substantially porous but coherent mass of copper powder containing phosphorus in proportions ranging from 5% to 10% by weight, the porosity being from 5% to 40% of the volume of the element.

2. A bonding element for bonding together two interfitting metallic tubes, said element being of ring shape and adapted to fit adjacent the space between the interfitting members and comprising a substantially porous but coherent mass of copper powder containing phosphorus in proportions ranging from 5% to 10%, the porosity being from 5% to 40% of the volume of the element.

3. A bonding element for bonding together two interfitting metallic members, said element being shaped to fit adjacent a space between the interfitting members in which the bond is to be formed and comprising a substantially porous but coherent mass of copper powder containing diffused free phosphorus, the phosphorus content of the element being from 5% to 10% and the porosity of the element being 5% to 40% of the volume of the element.

CHARLES HARDY.
RAYMOND L. PATTERSON.